(12) United States Patent
Merx et al.

(10) Patent No.: US 10,169,410 B2
(45) Date of Patent: Jan. 1, 2019

(54) MERGE OF STACKED CALCULATION VIEWS WITH HIGHER LEVEL PROGRAMMING LANGUAGE LOGIC

(71) Applicant: SAP SE, Walldorf (DE)

(72) Inventors: Johannes Merx, Heidelberg (DE); Tobias Mindnich, Sulzbach (DE); Christoph Weyerhaeuser, Heidelberg (DE)

(73) Assignee: SAP SE, Walldorf (DE)

( * ) Notice: Subject to any disclaimer, the term of this patent is extended or adjusted under 35 U.S.C. 154(b) by 458 days.

(21) Appl. No.: 14/945,360

(22) Filed: Nov. 18, 2015

(65) Prior Publication Data

US 2017/0139988 A1 May 18, 2017

(51) Int. Cl.
*G06F 17/30* (2006.01)

(52) U.S. Cl.
CPC ............... *G06F 17/30451* (2013.01)

(58) Field of Classification Search
CPC .................................................. G06F 17/30451
See application file for complete search history.

(56) References Cited

U.S. PATENT DOCUMENTS

| | | | | |
|---|---|---|---|---|
| 2004/0267769 A1* | 12/2004 | Galindo-Legaria | | G06F 17/30516 |
| 2005/0102613 A1* | 5/2005 | Boukouvalas | ...... | G06F 17/2247 715/237 |
| 2005/0235001 A1* | 10/2005 | Peleg | ................ | G06F 17/30383 |
| 2006/0101011 A1* | 5/2006 | Lindsay | ............ | G06F 17/30454 |
| 2009/0228434 A1* | 9/2009 | Krishnamurthy | ............................ | G06F 17/30445 |
| 2012/0109934 A1* | 5/2012 | Weyerhaeuser | .. | G06F 17/30463 707/713 |
| 2015/0261822 A1* | 9/2015 | Weyerhaeuser | .. | G06F 17/30477 707/718 |
| 2015/0363463 A1* | 12/2015 | Mindnich | ......... | G06F 17/30442 707/718 |
| 2016/0140175 A1* | 5/2016 | Weyerhaeuser | .. | G06F 17/30463 707/718 |

OTHER PUBLICATIONS

David DeHaan et al., "Stacked Indexed Views in Microsoft SQL Server", Jun. 14, 2005, ACM, pp. 179-190 (Year: 2005).*

* cited by examiner

*Primary Examiner* — Jared M Bibbee

(74) *Attorney, Agent, or Firm* — Mintz Levin Cohn Ferris Glovsky and Popeo, P.C.

(57) ABSTRACT

A stacked calculation view, defining a calculation scenario, having calculation views associated with high-level programming logic which can include complex analytical privileges. Resolving, using a high-level programming logic layer, a calculation view having associated high-level programming logic with the next calculation view in the stack to generate a sub-query. Converting the sub-query into a format readable by a database system and separating the part of the sub-query provided by the high-level programming logic from the sub-query to form a high-level programming logic filter in the database system format. Merge the high-level programming logic filter into the calculation scenario to provide a calculation scenario including high-level programming logic information in the database system format.

18 Claims, 6 Drawing Sheets

MERGE OF STACKED CALCULATION VIEWS WITH HIGHER LEVEL PROGRAMMING LANGUAGE LOGIC

TECHNICAL FIELD

The subject matter described herein relates to a database system that incorporates database-level logic into a query performed by a calculation engine layer of the database system.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Higher-level programming language logic is regularly developed by businesses and there is an increased need to incorporate the high-level programming logic into database analyses. High-level programming logic can be expressed in a complex manner such as with computer readable instructions. An example of such high-level programming logic includes user privileges. User privileges can be defined in a complex manner especially when a user is a member of multiple user groups, has multiple user types, or the like.

When applying the high-level programming language logic to the database analyses, the manner in which the high-level programming logic is processed and the manner in which the database analyses are processed can include conflicts that can cause inefficiencies or break calculation cycles.

SUMMARY

In one aspect, a method to be performed on one or more data processors comprising at least part of a computer system is described. The method can include one or more operations as described herein. The operations can include resolving, using a high-level programming logic layer, a first calculation view and a second calculation view below the first calculation view in a stacked calculation view of a calculation scenario to form a sub-query. The sub-query can be converted, using the high-level programming logic layer, into a database system format. A high-level programming logic tag can be applied, using the high-level programming logic layer, to the sub-query in the database system format. The sub-query can be merged, using the calculation engine layer, into the calculation scenario.

In some variations, merging the sub-query into the calculation scenario can include separating, using the calculation engine layer, the portion of the sub-query provided by the high-level programming logic from the rest of the sub-query, to generate a high-level programming logic filter in the database system format. The high-level programming logic filter can be applied, using the calculation engine layer, to the calculation scenario.

The high-level programming logic can include complex analytical privileges. Complex analytical privileges can be defined in SQL. Complex analytical privileges can define a database system user's rights to access database information managed by the database system.

The database system format can be column store syntax. The high-level programming logic layer is an SQL layer.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
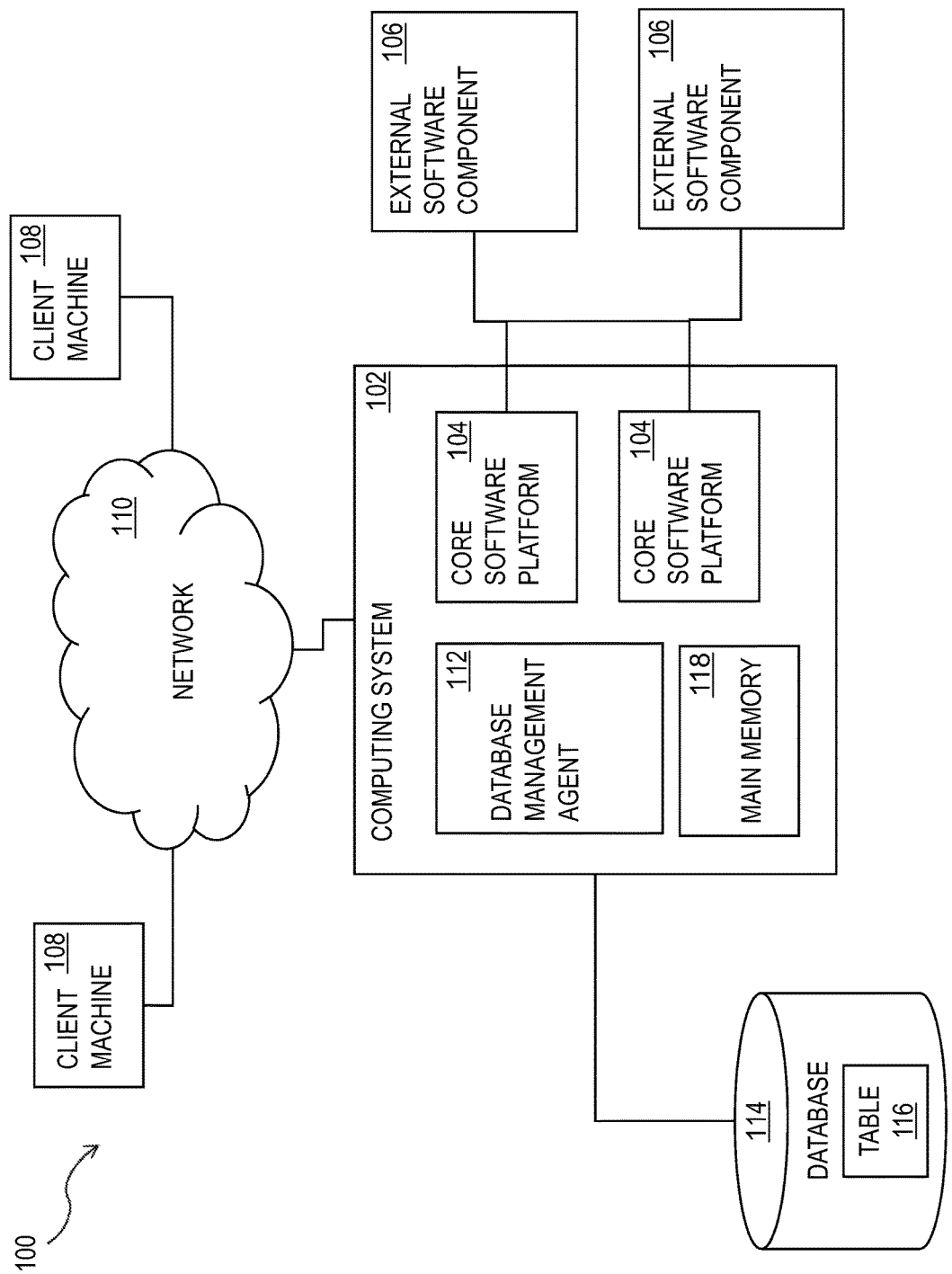
FIG. 1 shows a diagram of a system that can implement one or more features consistent with the current subject matter.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

A business operating a database system may have high-level programming logic that it desires to apply to analyzing the data managed by the database system. High-level programming logic has become more and more complex. In some variations, high-level programming logic can be expressed as complex machine readable instructions, or computer code. Computer code can be generated in multiple different programming languages and is processed in various ways associated with those programming languages. High-level programming logic is typically provided at the highest layer, or application layer. In some variations, this application layer may be a higher layer than the calculation engine layer of the database system. The high-level programming logic at the application layer typically does not include operators that are directly translatable to the physical layer which directly performs operations on the database tables. The high-level programming logic typically can be processed in a manner different than the processing of analyses on the database tables.

High-level programming logic may be developed for use in multiple different scenarios, one of which may include database analyses. Consequently, the database system needs to be able to incorporate the high-level programming logic in its higher-level programming language format, rather than force the provider of the high-level programming logic to recode the high-level programming logic in a manner that is easily processable by the physical layer of the database system.

One example of high-level programming logic can include user privileges. A user may have privileges to view and access a set of data. For example, the user may be involved in sales of a product within the United States and may have privileges to access sales data for the United States, but not for Europe. The user may also be a member of a brand oversight committee and have privileges to access data associated with branding of a product, which may include at least a subset of sales data for Europe. Consequently, the analytical privileges of that user can be based on multiple parameters and models. Those parameters and models can themselves be defined or can refer to other elements. Such other elements can include different database tables, external sources, or the like.

Users may have even more complex privilege structures that include several sub-selects on multiple tables, requiring the privileges to be programmed in a programming language, such as in Structured Query Language (SQL) or in a higher-level programming language. Such privilege structures may be referred to as analytical privileges, where analysis needs to be performed to determine a user's privileges with respect to information managed by the database system.

The database system can include a column store having an internal format representing queries and filters. The column store format can be in a lower-layer format that is different from the format of the high-level programming logic. Consequently, the high-level programming logic is not seamlessly embeddable into the analyses of the database.

Users of the database system can stack several calculation views. High-level programming logic may be associated with individual ones of the stacked calculation views. Each of the high-level programming logic components need to be considered when processing the query defined by the stacked calculation views. Therefore during execution of such a stacked calculation view, for each stacked calculation view a select on this sub calculation view is done to apply the high-level programming logic as additional filters. These additional filters are defined using the higher-level programming language or different programming language and not in the database programming language. For example, the high-level programming logic may be defined in SQL whereas the database may be defined in a column store syntax. Consequently, when the calculation engine processes the stacked calculation views, a switch must be made from the calculation engine to the processing engine for the high-level programming logic. These breaks can introduce inefficiencies and prevent high-level programming logic filters from being pushed down to lower calculation layers from higher calculation layers in the stacked calculation view.

The presently described subject matter contemplates modifying the high-level programming logic associated with individual ones of the stacked calculation views to be compatible with the calculation engine, avoiding the need to introduce breaks into the processing of the calculation engine, and facilitate pushing down of filters to lower calculation views in a stack. This will improve the efficiency of the processing of the query and improve the efficiency of the database system as a whole.

FIG. 1 shows a diagram of a system 100 that can implement one or more features of the current subject matter. A computing system 102 can include one or more core software platform modules 104 providing one or more features of a high-level programming software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

A database management agent 112 or other comparable functionality can access a database 114 that includes at least one table 116, which can in turn include at least one column. The database management agent 112 can implement one or more of the features of implementations discussed herein.

The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 112 or other comparable functionality can be configured to load a database table 116, or other comparable data set, into the main memory 118. The database management agent 112 can be configured to load the information from the database 114 to the main memory 118 in response to receipt of a query instantiated by a user or computer system through one or more client machines 108, external software components 106, core software platforms 104, or the like.

Figure 2:
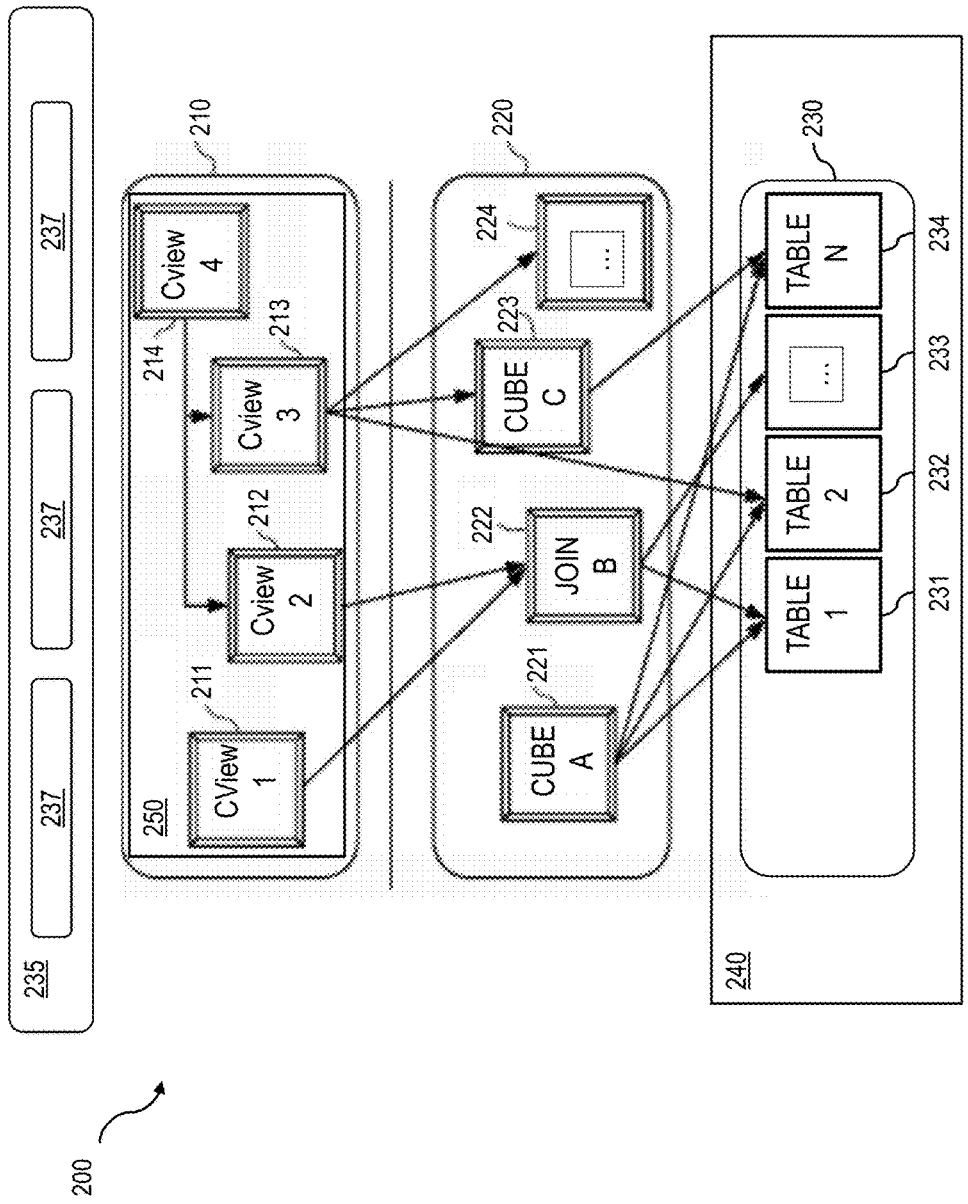
FIG. 2 is a diagram that illustrates a computing architecture having one or more features consistent with the current subject matter.
Figure 3:
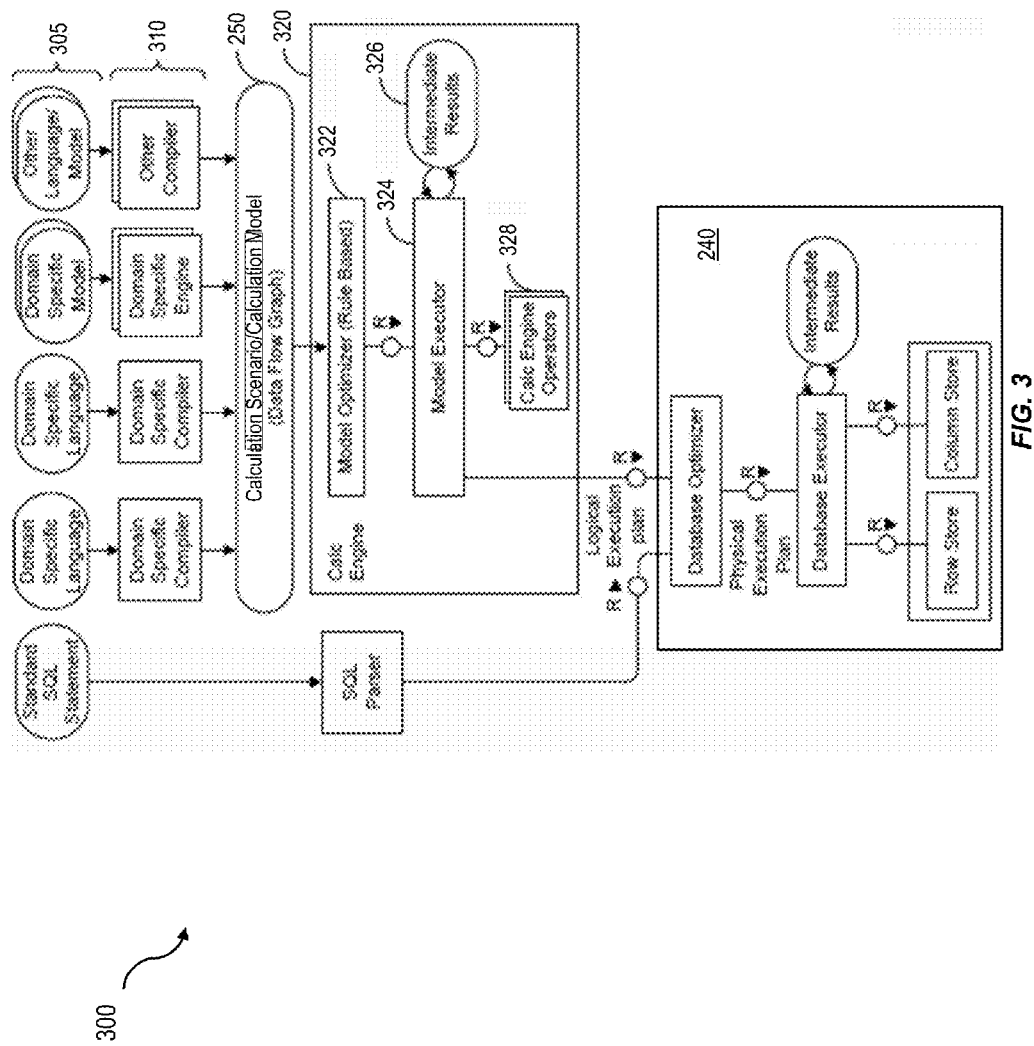
FIG. 3 is a diagram illustrating a sample architecture for request processing and execution control, the sample architecture having one or more features consistent with the current subject matter.

FIG. 2 is a diagram that illustrates a computing architecture 200 including a database system that includes three layers: a top layer, calculation engine layer 210, an intermediate layer, or logical layer 220, and a top layer, or physical table-pool 230. One or more application servers 235 implementing database client applications 237 can access the database system 300, as shown in FIG. 3. Calculation scenarios can be executed by a calculation engine, which can form part of a database or which can be part of the calculation engine layer 210 (which is associated with the database). The calculation engine layer 210 can be based on and/or interact with the other two layers, the logical layer 220 and the physical table pool 230. In some variations, the physical table pool 230 can comprise database operations configured to access and perform the database operations on the individual tables. In some variations, the basis of the physical table pool 230 consists of physical tables (called indexes) containing the data, which can be stored on one more database servers 240. Various tables 231-234 can be joined using logical metamodels 221-224 defined by the logical layer 220 to form an index. For example, the tables 231-234 in a cube (e.g. an online analytical processing or "OLAP" index) can be assigned roles (e.g., fact or dimension tables) and joined to form a star schema. It is also possible to form join indexes (e.g. join index B 222 in FIG. 2), which can act like database views in computing environments such as the Fast Search Infrastructure (FSI) available from SAP SE of Walldorf, Germany.

A calculation scenario 250 can include individual nodes (e.g. calculation nodes) 211-214, which in turn can each define operations such as joining various physical or logical indexes and other calculation nodes (e.g., CView 4 is a join of CView 2 and CView 3). That is, the input for a node 211-214 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 250, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 250. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 250 can be uniquely identifiable by a name (e.g., the calculation scenario 250 can be a database object with a unique identifier, etc.). Accordingly, the calculation scenario 250 can be queried in a manner similar to a view in a SQL database. Thus, the query is forwarded to the calculation node 211-214 for the calculation scenario 250 that is marked as the corresponding default node. In addition, a query can be executed on a particular calculation node 211-214 (as specified in the query). Furthermore, nested calculation scenarios can be generated in which one calculation scenario 250 is used as source in another calculation scenario (e.g. via a calculation node 211-214 in this calculation scenario 250). Each calculation node 211-214 can have one or more output tables. One output table can be consumed by several calculation nodes 211-214.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 250 (which is also referred to in in FIG. 3 as a calculation model). To achieve enhanced performance, the models and programs written in these languages are executed inside the database server 240. This arrangement eliminates the need to transfer large amounts of data between the database server 240 and a client application 237, which can be executed by an application server 235. Once the different artifacts 305 are compiled into this calculation scenario 315, they can be processed and executed in the same manner. A calculation engine 320 executes the calculation scenarios 315.

A calculation scenario 315 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 237 at the application server 235). Inputs can be connected to tables or to the outputs of other nodes. A calculation scenario 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 315 can be defined as part of database metadata and invoked multiple times. A calculation scenario 315 can be created, for example, by a SQL statement "CREATE CALCULATION SCENARIO <NAME> USING <XML or JSON>". Once a calculation scenario 315 is created, it can be queried (e.g., "SELECT A, B, C FROM <scenario name>", etc.). In some cases, databases can have pre-defined calculation scenarios 315 (default, previously defined by users, etc.). Calculation scenarios 315 can be persisted in a repository (coupled to the database server 240) or in transient scenarios. Calculation scenarios 315 can also be kept in-memory.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The calculation scenarios 315 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 315 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

Figure 4:
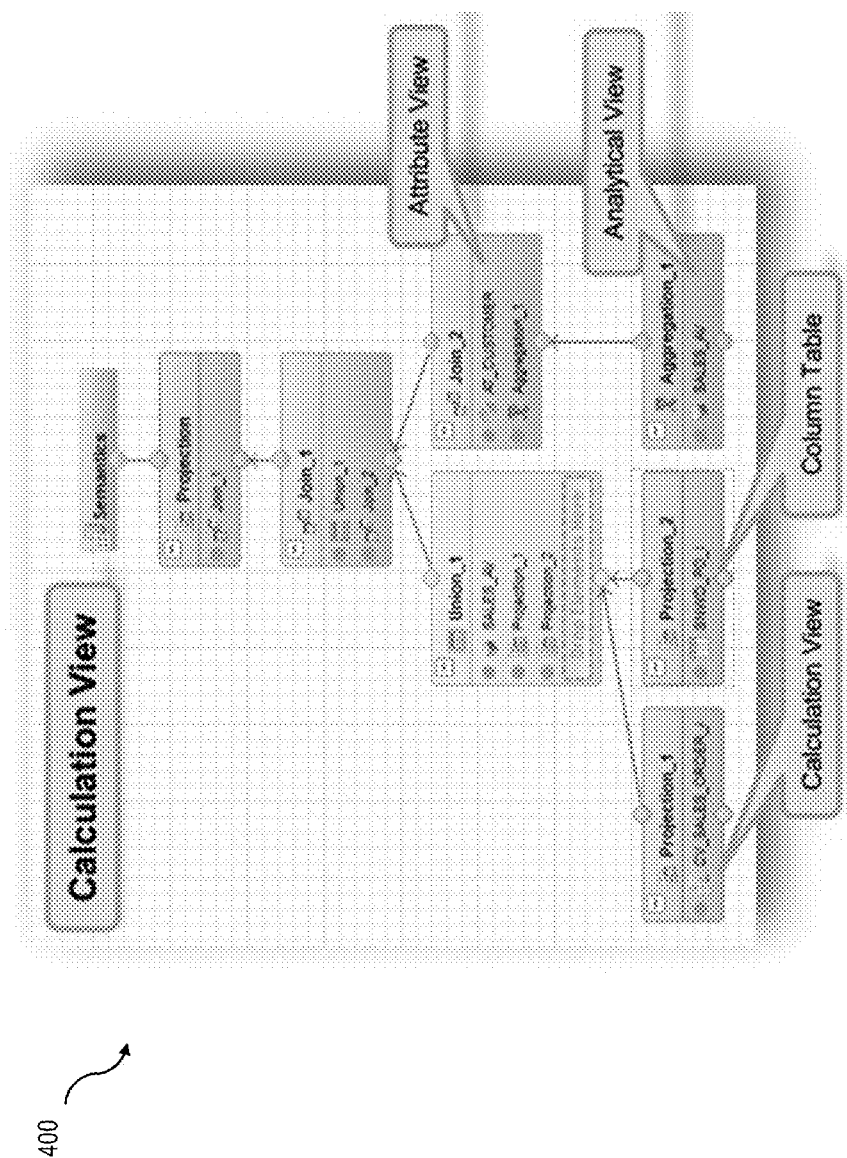
FIG. 4 is an illustration of an exemplary graphical calculation view having one or more features consistent with the current subject matter.

FIG. 4 is an illustration of an exemplary graphical calculation view 400 having one or more features consistent with the current subject matter. The graphical calculation view 400 is an example of a calculation view that can be presented to a user of the database management system. The calculation view can also be presented to a user in a scripted fashion. For example, an SQL script representing the calculation view can be presented to the user.

A calculation scenario 250 as described herein can include a type of node referred to herein as a semantic node (or sometimes semantic root node). A database modeler can flag the root node (output) in a graphical calculation view to which the queries of the database applications directed as semantic node. This arrangement allows the calculation engine 320 to easily identify those queries and to thereby provide a proper handling of the query in all cases.

The database tables 231-234 may be defined in column store syntax. The column store syntax can be associated with a column-based non-clustered index geared toward increasing query performance for workloads that involve large amounts of data, such as in databases.

High-level programming logic may be introduced at the calculation engine layer 210, or at a higher layer. The high-level programming logic may include analytical privileges. These analytical privileges may be associated with individual ones of the calculation nodes 211-214, or calculation views. The analytical privileges may define access rights to information specified by the calculations nodes 211-214. Various calculation nodes can be joined to various ones of the other calculation nodes. For example, calculation node 214 is a join of calculation node 212 and calculation node 213. Typically stacked calculation nodes can be merged. Merging stacked calculation views can allow the calculation engine of the calculation engine layer 210 to optimize the query and introduce efficiencies. When calculation nodes have associated high-level programming logic in a different format, they cannot be merged.

Figure 5:
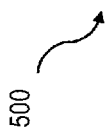
FIG. 5 is an example of complex high-level programming logic for use in a database system having one or more features consistent with the current subject matter; and, FIG. 6 is a process flow diagram illustrating a method having one or more features consistent with the presently described subject matter.

The presently described subject matter contemplates incorporating complex high-level programming logic, such as complex analytical privileges, into a calculation scenario in a format consistent with the format utilized by the calculation scenario processing engines. FIG. 5 is an example of complex high-level programming logic 500 for use in a database system having one or more features consistent with the current subject matter. The complex high-level programming logic 500, may include, for example, complex analytical privileges, that call other database objects and/or tables. Furthermore the high-level programming logic may be provided in a format not readable by the calculation scenario processing engines. The presently described subject matter contemplates modifying the high-level programming logic 500 to be merged with the calculation scenario, thereby improving the efficiency of processing the calculation scenario and facilitating optimization of the core database operations resulting from the calculation scenario.

Figure 6:
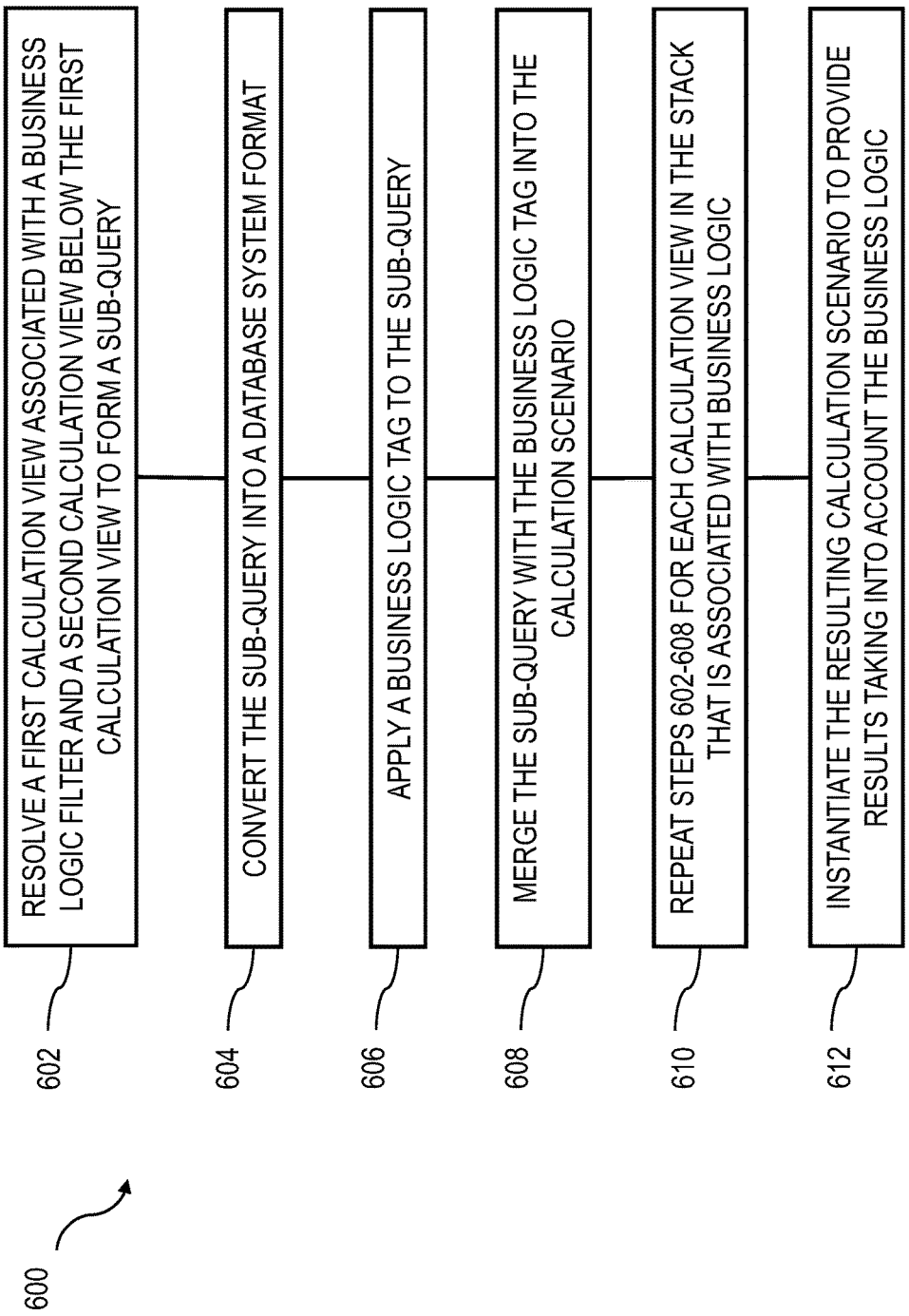

FIG. 6 is a process flow diagram 600 illustrating a method having one or more features consistent with the presently described subject matter.

At 602, a first calculation view associated with a high-level programming logic filter and a second calculation view below the first calculation view in the stacked calculation view of a calculation scenario can be resolved by the high-level programming logic layer to form a sub-query in the high-level programming logic format. In some variations, for example, the high-level programming logic can be complex analytical privileges defined in SQL. The high-level programming logic layer can be the SQL layer, for example at artifacts 305. The SQL layer can be configured to resolve the first calculation view, the second calculation view and the analytical privileges to form a sub-query.

In some variations, the high-level programming logic layer can include a high-level programming logic programming language processing engine. The high-level programming logic programming language processing engine may be configured to process instructions provided at a higher-level than the calculation engine layer.

At 604, the sub-query can be converted into a database system format by the high-level programming logic layer. Following the example above, the SQL-based sub-query can be converted into a column store syntax.

At 606, the high-level programming logic layer can apply a high-level programming logic tag to the sub-query in the database system format, the high-level programming logic tag providing an indication that the sub-query includes high-level programming logic. In some variations, the high-level programming logic tag can include a query hint. The resulting sub-query can be a filter for application in the calculation scenario.

At 608, the calculation engine layer 210 can merge the sub-query with the high-level programming logic tag into the calculation scenario. In some variations, the calculation engine layer 210 can be configured to separate the filter, which has resulted from the complex analytical privileges and is now in column store syntax format, from the query resulting from merging of the stacked calculation views. The calculation engine layer 210 can add the filter to the statement context for the calculation scenario.

At 610, steps 602, 604, 606, and 608 can be repeated for each calculation view in the stack having associated high-level programming logic.

At 612, the resulting calculation scenario can be instantiated resulting in results that take into account the high-level programming logic.

Without in any way limiting the scope, interpretation, or application of the claims appearing herein, a technical effect of one or more of the example embodiments disclosed herein may include facilitating the merging of calculation views of a calculation scenarios while maintaining the security features of each of the calculation views. The merge can improve the execution times for queries that include analytical privileges.

Without in any way limiting the scope, interpretation, or application of the claims appearing herein, a technical effect of one or more of the example embodiments disclosed herein may include introducing analytical privilege data for users into the calculation scenario to facilitate the creation of operations that can optimize or filter results based on those analytical privileges.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method to be performed on one or more data processors comprising at least part of a computer system, the method comprising:
    resolving, using a high-level programming logic layer, high level programming logic associated with a first calculation view and a second calculation view below the first calculation view in a stacked calculation view of a calculation scenario to form a sub-query, the high level programming logic comprising a plurality of complex analytical privileges, each complex analytical privilege comprising at least one sub-select on at least one database table;
    converting, using the high-level programming logic layer, the sub-query into a database system format;
    applying, using the high-level programming logic layer, a high-level programming logic tag to the sub-query in the database system format; and,
    merging, using a calculation engine layer, the sub-query into the calculation scenario, the calculation engine layer comprising the first and second calculation views.

2. The method of claim 1, wherein merging the sub-query into the calculation scenario comprises:
    separating, using the calculation engine layer, the portion of the sub-query provided by the high-level programming logic from the rest of the sub-query, to generate a high-level programming logic filter in the database system format; and,
    applying, using the calculation engine layer, the high-level programming logic filter to the calculation scenario.

3. The method of claim 1, wherein the complex analytical privileges are defined in SQL.

4. The method of claim 1, wherein the complex analytical privileges define a database system user's rights to access database information managed by the database system.

5. The method of claim 1, wherein the database system format is column store syntax.

6. The method of claim 1, wherein the high-level programming logic layer is an SQL layer.

7. A system comprising:
    at least one data processor; and,
    memory coupled to the at least one data processor, the memory storing instructions, which, when executed, cause the at least one data processor to perform operations comprising:
        resolving, using a high-level programming logic layer, high level programming logic associated with a first calculation view and a second calculation view below the first calculation view in a stacked calculation view of a calculation scenario to form a sub-query, the high level programming logic comprising a plurality of complex analytical privileges, each complex analytical privilege comprising at least one sub-select on at least one database table;
        converting, using the high-level programming logic layer, the sub-query into a database system format;
        applying, using the high-level programming logic layer, a high-level programming logic tag to the sub-query in the database system format; and,
        merging, using a calculation engine layer, the sub-query into the calculation scenario, the calculation engine layer comprising the first and second calculation views.

8. The system of claim 7, wherein merging the sub-query into the calculation scenario comprises:
    separating, using the calculation engine layer, the portion of the sub-query provided by the high-level programming logic from the rest of the sub-query, to generate a high-level programming logic filter in the database system format; and,
    applying, using the calculation engine layer, the high-level programming logic filter to the calculation scenario.

9. The system of claim 7, wherein the complex analytical privileges are defined in SQL.

10. The system of claim 7, wherein the complex analytical privileges define a database system user's rights to access database information managed by the database system.

11. The system of claim 7, wherein the database system format is column store syntax.

12. The system of claim 7, wherein the high-level programming logic layer is an SQL layer.

13. A non-transitory computer program product storing instructions that, when executed by at least one programmable processor forming part of at least one computing system, cause the at least one programmable processor to perform operations comprising:
    resolving, using a high-level programming logic layer, high level programming logic associated with a first calculation view and a second calculation view below the first calculation view in a stacked calculation view of a calculation scenario to form a sub-query, the high level programming logic comprising a plurality of complex analytical privileges, each complex analytical privilege comprising at least one sub-select on at least one database table;
    converting, using the high-level programming logic layer, the sub-query into a database system format;
    applying, using the high-level programming logic layer, a high-level programming logic tag to the sub-query in the database system format; and,
    merging, using a calculation engine layer, the sub-query into the calculation scenario, the calculation engine layer comprising the first and second calculation views.

14. The computer program product of claim 13, wherein merging the sub-query into the calculation scenario comprises:
- separating, using the calculation engine layer, the portion of the sub-query provided by the high-level programming logic from the rest of the sub-query, to generate a high-level programming logic filter in the database system format; and,
- applying, using the calculation engine layer, the high-level programming logic filter to the calculation scenario.

15. The computer program product of claim 13, wherein the complex analytical privileges are defined in SQL.

16. The computer program product of claim 13, wherein the complex analytical privileges define a database system user's rights to access database information managed by the database system.

17. The computer program product of claim 13, wherein the database system format is column store syntax.

18. The computer program product of claim 13, wherein the high-level programming logic layer is an SQL layer.

* * * * *